(12) United States Patent
Peters

(10) Patent No.: US 9,169,368 B2
(45) Date of Patent: Oct. 27, 2015

(54) RIGID FOAM AND ASSOCIATED ARTICLE

(71) Applicant: SABIC Innovative Plastics IP B.V., Bergen op Zoom (NL)

(72) Inventor: Edward Norman Peters, Lenox, MA (US)

(73) Assignee: SABIC GLOBAL TECHNOLOGIES B.V. (NL)

( * ) Notice: Subject to any disclaimer, the term of this patent is extended or adjusted under 35 U.S.C. 154(b) by 256 days.

(21) Appl. No.: 13/953,858

(22) Filed: Jul. 30, 2013

(65) Prior Publication Data

US 2015/0038610 A1    Feb. 5, 2015

(51) Int. Cl.
| | |
|---|---|
| C08G 18/48 | (2006.01) |
| C08J 9/14 | (2006.01) |
| C08J 9/04 | (2006.01) |
| C08J 9/08 | (2006.01) |
| C08G 18/08 | (2006.01) |
| C08G 18/66 | (2006.01) |
| C08G 18/76 | (2006.01) |
| C08G 101/00 | (2006.01) |

(52) U.S. Cl.
CPC ............... *C08J 9/146* (2013.01); *C08G 18/14* (2013.01); *C08G 18/4829* (2013.01); *C08G 18/4879* (2013.01); *C08G 18/6674* (2013.01); *C08G 18/76* (2013.01); *C08G 18/7671* (2013.01); *C08J 9/04* (2013.01); *C08J 9/08* (2013.01); *C08G 2101/005* (2013.01); *C08G 2101/0025* (2013.01); *C08G 2101/0041* (2013.01); *C08G 2101/0058* (2013.01); *C08G 2101/0066* (2013.01); *C08G 2101/0083* (2013.01); *C08J 2203/142* (2013.01); *C08J 2375/08* (2013.01)

(58) Field of Classification Search
CPC .............. C08G 18/14; C08G 18/4829; C08G 18/4879; C08G 18/6674; C08G 18/76; C08G 18/7671; C08G 2101/005; C08G 2101/0083; C08G 2101/0058; C08G 2101/0025; C08G 2101/0041; C08G 2105/0066; C08J 9/04; C08J 9/08; C08J 9/146; C08J 2203/141; C08J 2375/08

See application file for complete search history.

(56) References Cited

U.S. PATENT DOCUMENTS

| | | | |
|---|---|---|---|
| 3,383,340 A * | 5/1968 | Maccallum et al. | 524/370 |
| 3,770,850 A | 11/1973 | White | |
| 4,031,049 A * | 6/1977 | Hirosawa et al. | 521/163 |
| 4,238,580 A | 12/1980 | Loucks et al. | |
| 4,289,682 A | 9/1981 | Peters | |
| 4,487,918 A | 12/1984 | Heitz et al. | |
| 4,521,584 A | 6/1985 | Heitz et al. | |
| 4,677,185 A | 6/1987 | Heitz et al. | |
| 5,064,869 A | 11/1991 | Bopp et al. | |
| 5,164,421 A | 11/1992 | Kiamil et al. | |
| 5,225,101 A * | 7/1993 | Yamamori | 252/182.25 |
| 5,648,019 A | 7/1997 | White, III et al. | |
| 5,880,221 A | 3/1999 | Liska et al. | |
| 6,051,662 A | 4/2000 | Tracy et al. | |
| 6,066,681 A * | 5/2000 | Kaplan et al. | 521/125 |
| 6,307,010 B1 | 10/2001 | Braat et al. | |
| 6,962,965 B2 | 11/2005 | Yeager | |
| 7,541,421 B2 | 6/2009 | Carrillo et al. | |
| 7,615,604 B2 | 11/2009 | Vergorgt et al. | |
| 7,671,167 B2 | 3/2010 | Carrillo et al. | |
| 2005/0187373 A1 | 8/2005 | Yeager | |
| 2008/0076843 A1 | 3/2008 | Clark | |
| 2011/0124760 A1 | 5/2011 | Chen et al. | |
| 2011/0130476 A1 | 6/2011 | Chew et al. | |
| 2011/0152471 A1 | 6/2011 | Kamalakaran et al. | |
| 2012/0009414 A1 | 1/2012 | Golini | |
| 2012/0037410 A1 | 2/2012 | Amou et al. | |
| 2012/0259086 A1 | 10/2012 | Yamashita et al. | |

FOREIGN PATENT DOCUMENTS

| | | |
|---|---|---|
| CN | 102382382 A | 10/2000 |
| GB | 1330947 | 9/1973 |
| WO | 9304101 A1 | 3/1993 |
| WO | 2012177361 A1 | 12/2012 |

OTHER PUBLICATIONS

International Search Report dated Dec. 18, 2014; International Application No. PCT/US2014/054895; International Filing Date Sep. 10, 2014 (5 pages).
Written Opinion dated Dec. 18, 2014; International Application No. PCT/US2014/054895; International Filing Date Sep. 10, 2014 (4 pages).
U.S. Appl. No. 13/538,295, filed Jun. 29, 2012.
U.S. Appl. No. 13/647,829, filed Oct. 9, 2012.
U.S. Appl. No. 13/929,961, filed Jun. 28, 2013.
Chan et al., "Facile Quantitative Analysis of Hydroxyl End Groups of Poly(2,6-dimethyl-1,4-phenylene oxide)s by 31P NMR Spectroscopy", Macromolecules, 1994, vol. 27, pp. 6371-6375.
"DABCO 33-LV: Polyurethane Additives Product Bulletin", Air Products and Chemicals, Inc., 2012, Pub. No. 140-11-049-GLB, 2 pages.
Levchick et al., "Thermal decomposition, combustion and fire-retardancy of polyurethanes • a review of the recent literature", Polym. Int., 53, 1585-1610 (2004).
NIAX Catalyst A-1, Technical Data Sheet, Momentive, HCD-14618, Jul. 18, 2013, 3 pages.

(Continued)

*Primary Examiner* — John Cooney
(74) *Attorney, Agent, or Firm* — Cantor Colburn LLP

(57) ABSTRACT

A polyurethane or polyisocyanurate foam is prepared from a reaction mixture that includes comprising a polyol, an aromatic isocyanate compound, and a blowing agent. The polyol includes a poly(phenylene ether) having a number average molecular weight of 600 to 2000 atomic mass units and an average of 1.5 to 3 hydroxyl groups per molecule. The polyurethane or polyisocyanurate foam exhibits improved resistance to burning and/or reduced elapsed times to formation of tack-free foams relative to foams prepared without the poly (phenylene ether).

17 Claims, No Drawings

(56) References Cited

OTHER PUBLICATIONS

Polycat 8 Catalyst, Air Products and Chemical, Inc., downloaded Jul. 18, 2013, 2 pages.
U.S. Appl. No. 14/032,254, filed Sep. 30, 2013.
ETHACURE 100 CURATIVE, Product Data Sheet, Jul. 2011, 2 pages.
White, "Reactions of Poly (phenylene Oxide) s with Quinones. I. The Quinone-Coupling Reaction Between Low-Molecular-Weight Poly (2,6-Dimethyl-1,4-Phenylene Oxide) and 3,3',5,5'-Tetramethyl-4,4'-Diphenoquinone", Journal of Polymer Science: Polymer Chemistry Edition, vol. 19, 1981, pp. 1367-1383.
International Search Report dated Nov. 20, 2014; International Application No. PCT/US2014/048539; International Filing Date Jul. 29, 2014; (6 pages).
International Search Report dated Oct. 28, 2014; International Application No. PCT/US2014/043763; International Filing Date Jun. 24, 2014; 5 pages.
Written Opinion dated Nov. 20, 2014; International Application No. PCT/US2014/048539; International Filing Date Jul. 9, 2014 (5 pages).
Written Opinion dated Oct. 28, 2014; International Application No. PCT/US2014/043763; International Filing Date Jun. 24, 2014; 6 pages.
Non-Final Office Action dated Jun. 29, 2015; U.S. Appl. No. 14/032,254, filed Sep. 20, 2013 (16 pages).

* cited by examiner

RIGID FOAM AND ASSOCIATED ARTICLE

BACKGROUND OF THE INVENTION

Polyurethanes are prepared from compounds with at least two hydroxyl groups and compounds with at least two isocyanate groups. See, e.g., D. Randall and S. Lee, "The Polyurethanes Book", New York: John Wiley & Sons, 2003; and K. Uhlig, "Discovering Polyurethanes", New York: Hanser Gardner, 1999. The isocyanate groups of the isocyanate compound react with the hydroxyl groups of the hydroxyl compound to form urethane linkages. In many cases, the hydroxyl compound is a low molecular weight polyether or polyester. The isocyanate compound can be aliphatic or aromatic, and in the preparation of linear polyurethanes is typically difunctional (i.e., it is a diisocyanate). However, isocyanate compounds with greater functionality are used in preparing thermoset polyurethanes. The family of polyurethane resins is very complex because of the enormous variation in the compositional features of the hydroxyl compounds and isocyanate compounds. This variety results in a large numbers of polymer structures and performance profiles. Indeed, polyurethanes can be rigid solids, soft and elastomeric, or a have a foam (cellular) structure.

Rigid polyurethane and polyisocyanurate foams are particularly effective thermal insulators. Most applications are as insulating materials in construction. However, the inherent ability of polyurethane and polyisocyanurate foams to burn creates a need for reduced flammability. See, e.g., S. V. Levchik, E. D. Weil, "Thermal decomposition, combustion and fire-retardancy of polyurethanes—a review of the recent literature", Polymer International, volume 53, pages 1585-1610 (2004). And the production of polyurethane and polyisocyanurate foams often requires substantial elapsed times from mixing of reactants to formation of a tack-free solid foam.

There is therefore a need for polyurethane and polyisocyanurate foams exhibiting improved resistance to burning and/or reduced elapsed times to formation of tack-free foams.

BRIEF SUMMARY OF EMBODIMENTS OF THE INVENTION

One embodiment is a polyurethane or polyisocyanurate foam comprising the product of a reaction mixture comprising: a polyol comprising a poly(phenylene ether) having a number average molecular weight of 600 to 2000 atomic mass units and an average of 1.5 to 3 hydroxyl groups per molecule; an aromatic isocyanate compound having an average of at least 2 isocyanate groups per molecule; and a blowing agent; wherein the reaction mixture is characterized by an isocyanate index of 105 to 350; and wherein the polyurethane or polyisocyanurate foam has a core density of 0.03 to 0.7 gram/centimeter$^3$.

Another embodiment is an article comprising polyurethane or polyisocyanurate foam, the polyurethane or polyisocyanurate foam comprising the product of a reaction mixture comprising: a polyol comprising a poly(phenylene ether) having a number average molecular weight of 600 to 2000 atomic mass units and an average of 1.5 to 3 hydroxyl groups per molecule; an aromatic isocyanate compound having an average of at least 2 isocyanate groups per molecule; and a blowing agent; wherein the reaction mixture is characterized by an isocyanate index of 105 to 350; and wherein the polyurethane or polyisocyanurate foam has a core density of 0.03 to 0.7 gram/centimeter$^3$.

These and other embodiments are described in detail below.

DETAILED DESCRIPTION OF THE INVENTION

The present inventor has determined that polyurethane and polyisocyanurate foams exhibiting improved resistance to burning and/or reduced elapsed times to formation of tack-free foams can be prepared from a polyol, an aromatic isocyanate compound, and a blowing agent, wherein the polyol comprises a low molecular weight, multifunctional poly(phenylene ether).

Thus, one embodiment is a polyurethane or polyisocyanurate foam comprising the product of a reaction mixture comprising: a polyol comprising a poly(phenylene ether) having a number average molecular weight of 600 to 2000 atomic mass units and an average of 1.5 to 3 hydroxyl groups per molecule; an aromatic isocyanate compound having an average of at least 2 isocyanate groups per molecule; and a blowing agent; wherein the reaction mixture is characterized by an isocyanate index of 105 to 350; and wherein the polyurethane or polyisocyanurate foam has a core density of 0.03 to 0.7 gram/centimeter$^3$.

The polyol employed in the reaction mixture comprises a poly(phenylene ether). The poly(phenylene ether) has a number average molecular weight of 600 to 2,000 atomic mass units, as determined by gel permeation chromatography using polystyrene standards. Within this range, the number average molecular weight can be 1,000 to 1,500. The poly(phenylene ether) has an average of 1.5 to 3 hydroxyl groups per molecule. Within this range, the number of hydroxyl groups per molecule can be 1.6 to 2.5, specifically 1.7 to 2.1. The average number of hydroxyl groups per molecule can be determined by functionalization with a phosphorus reagent and analysis by $^{31}$P NMR as described in P. Chan, D. S. Argyropoulos, D. M. White, G. W. Yeager, and A. S. Hay, Macromolecules, 1994, volume 27, pages 6371-6375.

The poly(phenylene ether) can be prepared by a redistribution reaction of a poly(phenylene ether) having an average of about one hydroxyl group per molecule with a phenolic compound as described, for example, in U.S. Pat. No. 5,880,221 to Liska et al., U.S. Pat. No. 6,307,010 B1 to Braat et al.

Alternatively, the poly(phenylene ether) can be prepared by the copolymerization of a monohydric phenol and a dihydric phenol or polyhydric phenol as described, for example, in U.S. Pat. No. 7,671,167 to Carrillo et al. In some embodiments, the poly(phenylene ether) is a copolymer of monomers comprising a monohydric phenol and a dihydric phenol. In some embodiments, the monohydric phenol has the structure

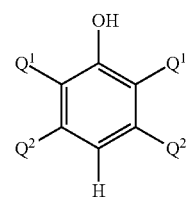

wherein each occurrence of $Q^1$ is independently halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; and each occurrence of $Q^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms. As used herein, the term "hydrocarbyl", whether used by itself, or as a prefix, suffix, or fragment of another term, refers to a residue that contains only carbon and hydrogen. The residue can be aliphatic or aromatic, straight-chain, cyclic, bicyclic, branched, saturated, or unsaturated. It can also contain combinations of aliphatic, aromatic, straight chain, cyclic, bicyclic, branched, saturated, and unsaturated hydrocarbon moieties. However, when the hydrocarbyl residue is described as substituted, it can, optionally, contain heteroatoms over and above the carbon and hydrogen members of the substituent residue. Thus, when specifically described as substituted, the hydrocarbyl residue can also contain one or more carbonyl groups, amino groups, hydroxyl groups, or the like, or it can contain heteroatoms within the backbone of the hydrocarbyl residue. As one example, $Z^1$ can be a di-n-butylaminomethyl group formed by reaction of a terminal 3,5-dimethyl-1,4-phenyl group with the di-n-butylamine component of an oxidative polymerization catalyst. In one some, the monohydric phenol is selected from 2,6-dimethylphenol, 2,3,6-trimethylphenol, and combinations thereof. In some embodiments, the monohydric phenol comprises 2,6-dimethylphenol.

In some embodiments, the dihydric phenol has the structure

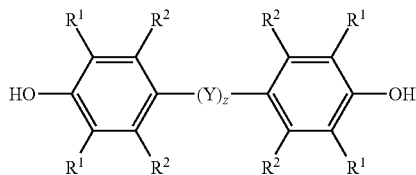

wherein each occurrence of $R^1$ and $R^2$ is independently hydrogen, halogen, unsubstituted or substituted $C_1$-$C_{12}$ hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; Z is 0 or 1; and Y is selected from

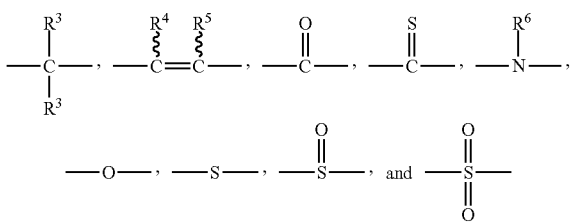

wherein each occurrence of $R^3$-$R^6$ is independently hydrogen or $C_1$-$C_{12}$ hydrocarbyl. In some embodiments, the dihydric phenol is selected from 1,1-bis(3,5-dimethyl-4-hydroxyphenyl)ethane, 1,1-bis(3-chloro-4-hydroxyphenyl)ethane, 1,1-bis(3-methyl-4-hydroxyphenyl)ethane, 1,2-bis(4-hydroxy-3,5-dimethylphenyl)-1,2-diphenylethane, 1,2-bis(3-methyl-4-hydroxyphenyl)-1,2-diphenylethane, 1,2-bis(3-methyl-4-hydroxyphenyl)ethane, 2,2'-binaphthol, 2,2'-biphenol, 2,2'-dihydroxy-4,4'-dimethoxybenzophenone, 2,2'-dihydroxy-4-methoxybenzophenone, 2,2'-dihydroxybenzophenone, 2,2-bis(3,5-dichloro-4-hydroxyphenyl)propane, 2,2-bis(3-bromo-4-hydroxyphenyl)propane, 2,2-bis(3-phenyl-4-hydroxyphenyl)propane, 2,2-bis(3-methyl-4-hydroxyphenyl)propane, 2,2-bis(3,5-dimethyl-4-hydroxyphenyl)propane, 1,1-bis(3,5-dimethyl-4-hydroxyphenyl)-1-phenylethane, 1,1-bis(3-chloro-4-hydroxyphenyl)-1-phenylethane, 1,1-bis(3-methyl-4-hydroxyphenyl)-1-phenylethane, 2,2-bis(4-hydroxy-3,5-dimethyl phenyl)-1-phenylpropane, 2,2-bis(4-hydroxy-3,5-dimethyl phenyl)hexane, 2,2-bis(4-hydroxy-3,5-dimethylphenyl)pentane, 2,2-bis(3-methyl-4-hydroxynaphthyl)propane, 2,2-bis(3-methyl-4-hydroxyphenyl)-1-phenylpropane, 2,2-bis(3-methyl-4-hydroxyphenyl)hexane, 2,2-bis(3-methyl-4-hydroxyphenyl)pentane, 2,2'-methylenebis(4-methylphenol), 2,2'-methylenebis[4-methyl-6-(1-methylcyclohexyl)phenol], 3,3',5,5'-tetramethyl-4,4'-biphenol, 3,3'-dimethyl-4,4'-biphenol, bis(2-hydroxyphenyl)methane, bis(4-hydroxy-2,6-dimethyl-3-methoxyphenyl)methane, bis(3,5-dimethyl-4-hydroxyphenyl)methane, bis(3-methyl-4-hydroxyphenyl)methane, bis(4-hydroxy-3,5-dimethyl phenyl) cyclohexylmethane, bis(4-hydroxy-3,5-dimethyl phenyl) phenylmethane, bis(3-methyl-4-hydroxyphenyl) cyclohexylmethane, bis(3-methyl-4-hydroxyphenyl) methane, bis(3,5-dimethyl-4-hydroxyphenyl)methane, bis (3-methyl-4-hydroxyphenyl)phenylmethane, 2,2',3,3',5,5'-hexamethyl-4,4'-biphenol, octafluoro-4,4'-biphenol, 2,3,3',5,5'-pentamethyl-4,4'-biphenol, 1,1-bis(3,5-dibromo-4-hydroxyphenyl)cyclohexane 1,1-bis(3,5-dimethyl-4-hydroxyphenyl)cyclohexane, bis(3-methyl-4-hydroxyphenyl)cyclohexane, tetrabromobiphenol, tetrabromobisphenol A, tetrabromobisphenol S, 2,2'-diallyl-4,4'-bisphenol A, 2,2'-diallyl-4,4'-bisphenol S, 3,3',5,5'-tetramethyl-4,4'-bisphenol sulfide, 3,3'-dimethyl bisphenol sulfide, 3,3',5,5'-tetramethyl-4,4'-bisphenolsulfone, and combinations thereof. In some embodiments, the dihydric phenol comprises 2,2-bis(3,5-dimethyl-4-hydroxyphenyl) propane.

In some embodiments, the monohydric phenol comprises 2,6-dimethylphenol and the dihydric phenol comprises 2,2-bis(3,5-dimethyl-4-hydroxyphenyl)propane.

In some embodiments, the poly(phenylene ether) comprises a hydroxy-diterminated poly(phenylene ether) having the structure

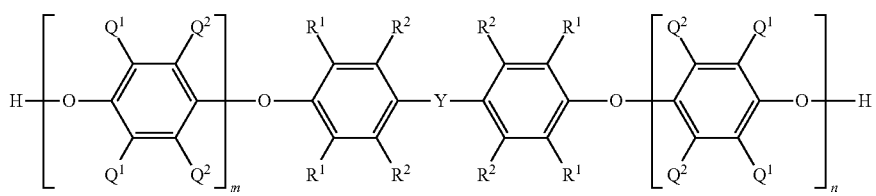

wherein each occurrence of $Q^1$ is independently halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $Q^2$ is independently hydrogen, halogen, $C_1$-$C_{12}$ hydrocarbylthio, $C_1$-$C_{12}$ hydrocarbyloxy, $C_2$-$C_{12}$ halohydrocarbyloxy wherein at least two carbon atoms separate the halogen and oxygen atoms, or unsubstituted or substituted $C_1$-$C_{12}$ hydrocarbyl provided that the hydrocarbyl group is not tertiary hydrocarbyl; each occurrence of $R^1$ and $R^2$ is independently hydrogen, halogen, unsubstituted or substituted $C_1$-$C_{12}$, hydrocarbyl provided that the hydrocarbyl group is not tertiary hydrocarbyl, $C_1$-$C_{12}$ hydrocarbylthio, $C_1$-$C_{12}$ hydrocarbyloxy, or $C_2$-$C_{12}$ halohydrocarbyloxy wherein at least two carbon atoms separate the halogen and oxygen atoms; m and n are independently 0 to 20, specifically 0 to 15, provided that the sum of m and n is at least 3; and Y is selected from

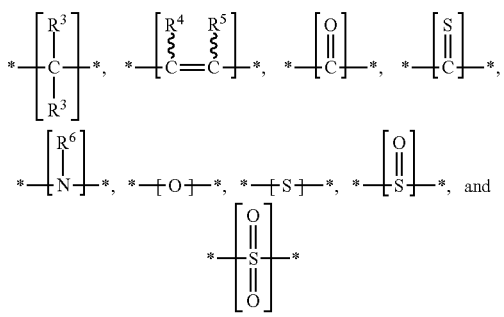

wherein each occurrence of $R^3$-$R^6$ is independently hydrogen or $C_1$-$C_{12}$ hydrocarbyl.

In some embodiments, the poly(phenylene ether) comprises a hydroxy-diterminated poly(phenylene ether) having the structure

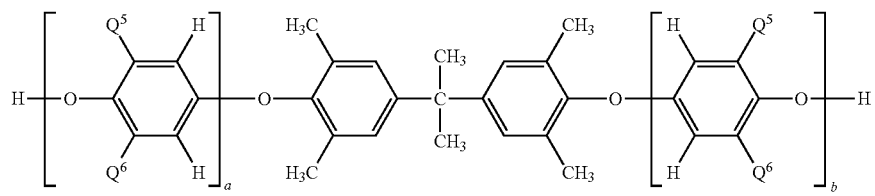

wherein each occurrence of $Q^5$ and $Q^6$ is independently methyl or di-n-butylaminomethyl, and each occurrence of a and b is independently 0 to 15, provided that the sum of a and b is 3 to 15.

The polyol can comprise the poly(phenylene ether) in an amount of 5 to 100 weight percent, based on the total weight of the polyol. Within this range, the poly(phenylene ether) amount can be 5 to 75 weight percent, specifically 5 to 50 weight percent, more specifically 10 to 40 weight percent, still more specifically 10 to 30 weight percent.

When the polyol comprises less than 100 weight percent of the poly(phenylene ether), it comprises an additional polyol. The additional polyol can include, for example, an ethoxylated saccharide, a propoxylated saccharide, a butoxylated saccharide, an ethoxylated glycerin, a propoxylated glycerin, a butoxylated glycerin, an ethoxylated diethanolamine, a propoxylated diethanolamine, a butoxylated diethanolamine, an ethoxylated triethanolamine, a propoxylated triethanolamine, a butoxylated triethanolamine, an ethoxylated trimethylolpropane, a propoxylated trimethylolpropane, a butoxylated trimethylolpropane, an ethoxylated erythritol, a propoxylated erythritol, a butoxylated erythritol, an ethoxylated pentaerythritol, a propoxylated pentaerythritol, a butoxylated pentaerythritol, an ethoxylated ethylenediamine, a propoxylated ethylenediamine, a butoxylated ethylenediamine, an aliphatic polyester diol, an aromatic polyester polyol, or a combination thereof. In some embodiments, the additional polyol comprises a propoxylated sucrose, a propoxylated glycerin, an aromatic polyester diol, or a combination thereof. When present, the additional polyol is used in an amount of 1 to 99 weight percent, based on the total weight of the polyol. Within this range, the additional polyol amount can be 25 to 95 weight percent, specifically 50 to 95 weight percent, more specifically 60 to 90 weight percent, still more specifically 70 to 90 weight percent.

In addition to the polyol, the reaction mixture comprises an aromatic isocyanate compound. The aromatic isocyanate compound comprises at least one aromatic ring and has an average of 1.5 to 5 isocyanate groups per molecule. Within this range, the average number of isocyanate groups per molecule can be 1.5 to 4, specifically 2 to 4. Examples of aromatic isocyanate compounds include 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha',alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, an oligomeric diphenylmethane diisocyanate having an average of greater than 2 and less than or equal to 4 isocyanate groups per molecule, or a combination thereof. In some embodiments, the aromatic isocyanate compound comprises an oligomeric diphenylmethane diisocyanate having an average of greater than 2 and less than or equal to 4 isocyanate groups per molecule.

Those skilled in the art understand that there is a continuum between polyurethane and polyisocyanurate foams. Either or both can prepared from the polyol and the aromatic isocyanate compound. Reaction mixtures used to prepare polyurethane and polyisocyanurate foams are characterized by an isocyanate index, which is calculated according to the equation $$\text{Isocyanate Index} = \frac{\text{Moles}_{NCO}}{\text{Moles}_{OH} + \text{Moles}_{HOH} + \text{Moles}_{NH}} \times 100$$

wherein $\text{Moles}_{NCO}$ is the moles of isocyanate groups in the reaction mixture, $\text{Moles}_{OH}$ is the moles of OH groups in the reaction mixture from sources other than water (including OH groups from alcohols and carboxylic acids), $\text{Moles}_{HOH}$ is the moles of OH groups in the reaction mixture from water, and $\text{Moles}_{NH}$ is the moles of NH groups in the reaction mixture. In general, the reaction mixture is characterized by an isocyanate index of 105 to 350. When the reaction mixture molar ratio of isocyanate groups to hydroxyl groups is 1:1 and no water or NH groups are present in the reaction mixture, the isocyanate index is 100, and a "pure" polyurethane is formed. The products of reaction mixtures having an isocyanate index of 100 to 125, specifically 105 to 125, are typically characterized as polyurethanes, while the products of reaction mixtures having an isocyanate index of 180 to 350 are typically characterized as polyisocyanurates. Formation of isocyanurate groups is favored not only by high isocyanate indices, but also by use of catalysts for isocyanurate formation, such as N-hydroxyalkyl quaternary ammonium carboxylates.

In addition to the polyol and the aromatic isocyanate compound, the reaction mixture includes a blowing agent. Blowing agents useful in the method including physical blowing agents, chemical blowing agents, and combinations thereof. Physical blowing agents can be, for example, $C_3$-$C_5$ hydrofluoroalkanes and $C_3$-$C_5$ hydrofluoroalkenes. The hydrofluoroalkane and hydrofluoroalkene blowing agents can also contain one or more hydrogen atoms and/or halogen atoms other than fluorine. In some embodiments, the hydrofluoroalkane and hydrofluoroalkene blowing agents have a boiling point of 10 to 40° C. at 1 atmosphere. Specific physical blowing agents include 1,1-difluoroethane, 1,1,1,2-tetrafluoroethane, pentafluoroethane, 1,1,1,3,3-pentafluoropropane, 1,1,1,3,3-pentafluorobutane, 2-bromopentafluoropropene, 1-bromopentafluoropropene, 3-bromopentafluoropropene, 3,4,4,5,5,5-heptafluoro-1-pentene, 3-bromo-1,1,3,3-tetrafluoropropene, 2-bromo-1,3,3,3-tetrafluoropropene, 1-bromo-2,3,3,3-tetrafluoropropene, 1,1,2,3,3,4,4-heptafluorobut-1-ene, 2-bromo-3,3,3-trifluoropropene, E-1-bromo-3,3,3-trifluoropropene-1, (Z)-1,1,1,4,4,4-hexafluoro-2-butene, 3,3,3-trifluoro-2-(trifluoromethyl)propene, 1-chloro-3,3,3-trifluoropropene, 2-chloro-3,3,3-trifluoropropene, 1,1,1-trifluoro-2-butene, and combinations thereof. The physical blowing agent, when used, can be present at 2 to 20 weight percent, based on the total weight of the reaction mixture. Within this range, the physical blowing agent amount can be 2.5 to 15 weight percent.

Chemical blowing agents include water and carboxylic acids that react with isocyanate groups to liberate carbon dioxide. When present, chemical blowing agents, and specifically water, can be used in an amount of 0.2 to 5 weight percent, based on the total weight of the reaction mixture. Within this range, the chemical blowing agent amount can be 0.2 to 3 weight percent.

In addition to the polyol, the isocyanate compound, and the blowing agent, the reaction mixture can include additives such as, for example, catalysts, surfactants, flame retardants, smoke suppressants, fillers and/or reinforcements other than the particulate poly(phenylene ether), antioxidants, UV stabilizers, antistatic agents, infrared radiation absorbers, viscosity reducing agents, pigments, dyes, mold release agents, antifungal agents, biocides, and combinations thereof.

Catalysts include urethane catalysts, isocyanurate catalysts, and combinations thereof. Suitable catalysts include tertiary amine catalysts such as dimethylcyclohexylamine, benzyldimethylamine, N,N,N',N'',N''-pentamethyldiethylenetriamine, 2,4,6-tris(dimethylaminomethyl)-phenol, triethylenediamine, N,N-dimethyl ethanolamine, and combinations thereof organometallic compounds such as potassium octoate (2-ethyl hexanoate), potassium acetate, dibutyltin dilaurate, dibutlytin diacetate, and combinations thereof; quaternary ammonium salts such as 2-hydroxypropyl trimethylammonium formate; N-substituted triazines such as N,N',N''-dimethylaminopropylhexahydrotriazine; and combinations thereof.

Surfactants include, for example, polyorganosiloxanes, polyorganosiloxane polyether copolymers, phenol alkoxylates (such as ethoxylated phenol), alkylphenol alkoxylates (such as ethoxylated nonylphenol), and combinations thereof. The surfactants can function as emulsifiers and/or foam stabilizers.

Flame retardants include, for example, organophosphorous compounds such as organic phosphates (including trialkyl phosphates such as triethyl phosphate and tris(2-chloropropyl)phosphate, and triaryl phosphates such as triphenyl phosphate and diphenyl cresyl phosphate), phosphites (including trialkyl phosphites, triaryl phosphites, and mixed alkyl-aryl phosphites), phosphonates (including diethyl ethyl phosphonate, dimethyl methyl phosphonate), polyphosphates (including melamine polyphosphate, ammonium polyphosphates), polyphosphites, polyphosphonates, phosphinates (including aluminum tris(diethyl phosphinate)); halogenated flame retardants such as tetrabromophthalate esters and chlorinated paraffins; metal hydroxides such as magnesium hydroxide, aluminum hydroxide, cobalt hydroxide, and hydrates of the foregoing metal hydroxide; and combinations thereof. The flame retardant can be a reactive type flame-retardant (including polyols which contain phosphorus groups, 10-(2,5-dihydroxyphenyl)-10H-9-oxa-10-phosphaphenanthrene-10-oxide, phosphorus-containing lactone-modified polyesters, ethylene glycol bis(diphenyl phosphate), neopentylglycol bis(diphenyl phosphate), amine- and hydroxyl-functionalized siloxane oligomers). These flame retardants can be used alone or in conjunction with other flame retardants.

When present, additives are typically used in a total amount of 0.01 to 30 weight percent, based on the total weight of the reaction mixture. Within this range, the total additive amount can be 0.02 to 10 weight percent.

The polyurethane or polyisocyanurate foam has a core density of 0.03 to 0.7 grams/centimeter$^3$ determined at 23° C. using ASTM D 1622-03. Within this range, the core density can be 0.03 to 0.2 grams/centimeter$^3$, specifically 0.03 to 0.06 grams/centimeter$^3$.

In a very specific embodiment, the polyurethane or polyisocyanurate foam is a polyurethane foam, and the isocyanate index is 105 to 125; the poly(phenylene ether) has a number average molecular weight of 1000 to 1500 atomic mass units and an average of 1.6 to 2.5 hydroxyl groups per molecule; the poly(phenylene ether) is a copolymer of a monohydric phenol comprising 2,6-dimethylphenol and a dihydric phenol comprising 2,2-bis(3,5-dimethyl-4-hydroxyphenyl)propane; the polyol comprises the poly(phenylene ether) in an amount of 5 to 50 weight percent, based on the weight of the polyol composition, and further comprises 50 to 95 weight percent of a propoxylated sucrose, a propoxylated glycerin, or a combination thereof; and the aromatic isocyanate compound comprises an oligomeric diphenylmethane diisocyanate having an average of greater than 2 and less than or equal to 4 isocyanate groups per molecule.

In another very specific embodiment, the polyurethane or polyisocyanurate foam is a polyisocyanurate foam, and the isocyanate index is 180 to 350; the poly(phenylene ether) has a number average molecular weight of 1000 to 1500 atomic mass units and an average of 1.6 to 2.5 hydroxyl groups per molecule; the poly(phenylene ether) is a copolymer of a monohydric phenol comprising 2,6-dimethylphenol and a dihydric phenol comprising 2,2-bis(3,5-dimethyl-4-hydroxyphenyl)propane; the polyol comprises the poly(phenylene ether) in an amount of 5 to 50 weight percent, based on the weight of the polyol composition, and further comprises 50 to 95 weight percent of a propoxylated sucrose, a propoxylated glycerin, an aromatic polyester diol, or a combination thereof; and the aromatic isocyanate compound comprises an oligomeric diphenylmethane diisocyanate having an average of greater than 2 and less than or equal to 4 isocyanate groups per molecule.

The invention includes articles comprising the polyurethane or polyisocyanurate foam. Thus, one embodiment is an article comprising polyurethane or polyisocyanurate foam, the polyurethane or polyisocyanurate foam comprising the product of a reaction mixture comprising: a polyol comprising a poly(phenylene ether) having a number average molecular weight of 600 to 2000 atomic mass units and an average of 1.5 to 3 hydroxyl groups per molecule; an aromatic isocyanate compound having an average of at least 2 isocyanate groups per molecule, and a blowing agent; wherein the reaction mixture is characterized by an isocyanate index of 105 to 350; and wherein the polyurethane or polyisocyanurate foam has a core density of 0.03 to 0.7 gram/centimeter$^3$.

All of the variations of the foam described above apply as well to the foam as a component of the article. Specific examples of articles that can utilize the polyurethane or polyisocyanurate foam as a thermal insulation material include domestic appliances (such as domestic and commercial refrigerators and freezers, and water tanks); building materials (such as floor insulation panels, wall insulation panels, roof insulation panels, cut-to-size pieces from slab stock, and spray-in-place foam for insulation and sealing); thermally insulated tanks and containers, pipelines, heating pipes, cooling pipes, and cold stores; and thermally insulated refrigerated vehicles for road and rail, including containers. In some embodiments, the article is a refrigerator, a freezer, a water tank, a floor insulation panel, a wall insulation panel, a roof insulation panel, a thermally insulated pipe, or a thermally insulated container.

In a very specific embodiment of the article, the polyurethane or polyisocyanurate foam is a polyurethane foam, and the isocyanate index is 105 to 125; the poly(phenylene ether) has a number average molecular weight of 1000 to 1500 atomic mass units and an average of 1.6 to 2.5 hydroxyl groups per molecule; the poly(phenylene ether) is a copolymer of a monohydric phenol comprising 2,6-dimethylphenol and a dihydric phenol comprising 2,2-bis(3,5-dimethyl-4-hydroxyphenyl)propane; the polyol comprises the poly(phenylene ether) in an amount of 5 to 50 weight percent, based on the weight of the polyol composition, and further comprises 50 to 95 weight percent of a propoxylated sucrose, a propoxylated glycerin, or a combination thereof; and the aromatic isocyanate compound comprises an oligomeric diphenylmethane diisocyanate having an average of greater than 2 and less than or equal to 4 isocyanate groups per molecule.

In another very specific embodiment of the article, the polyurethane or polyisocyanurate foam is a polyisocyanurate foam, and the isocyanate index is 180 to 350; the poly(phenylene ether) has a number average molecular weight of 1000 to 1500 atomic mass units and an average of 1.6 to 2.5 hydroxyl groups per molecule; the poly(phenylene ether) is a copolymer of a monohydric phenol comprising 2,6-dimethylphenol and a dihydric phenol comprising 2,2-bis(3,5-dimethyl-4-hydroxyphenyl)propane; the polyol comprises the poly(phenylene ether) in an amount of 5 to 50 weight percent, based on the weight of the polyol composition, and further comprises 50 to 95 weight percent of a propoxylated sucrose, a propoxylated glycerin, an aromatic polyester diol, or a combination thereof; and the aromatic isocyanate compound comprises an oligomeric diphenylmethane diisocyanate having an average of greater than 2 and less than or equal to 4 isocyanate groups per molecule.

All ranges disclosed herein are inclusive of the endpoints, and the endpoints are independently combinable with each other. Each range disclosed herein constitutes a disclosure of any point or sub-range lying within the disclosed range.

The invention includes at least the following embodiments.

Embodiment 1

A polyurethane or polyisocyanurate foam comprising the product of a reaction mixture comprising: a polyol comprising a poly(phenylene ether) having a number average molecular weight of 600 to 2000 atomic mass units and an average of 1.5 to 3 hydroxyl groups per molecule; an aromatic isocyanate compound having an average of at least 2 isocyanate groups per molecule; and a blowing agent; wherein the reaction mixture is characterized by an isocyanate index of 105 to 350; and wherein the polyurethane or polyisocyanurate foam has a core density of 0.03 to 0.7 gram/centimeter$^3$.

Embodiment 2

The polyurethane or polyisocyanurate foam of embodiment 1, wherein the poly(phenylene ether) is a copolymer of monomers comprising a monohydric phenol and a dihydric phenol.

Embodiment 3

The polyurethane or polyisocyanurate foam of embodiment 2, wherein the monohydric phenol comprises 2,6-dimethylphenol and the dihydric phenol comprises 2,2-bis(3,5-dimethyl-4-hydroxyphenyl)propane.

Embodiment 4

The polyurethane or polyisocyanurate foam of any of embodiments 1-3, wherein the polyol comprises the poly (phenylene ether) in an amount of 5 to 50 weight percent, based on the weight of the polyol.

Embodiment 5

The polyurethane or polyisocyanurate foam of any of embodiments 1-4, wherein the polyol further comprises an ethoxylated saccharide, a propoxylated saccharide, a butoxylated saccharide, an ethoxylated glycerin, a propoxylated glycerin, a butoxylated glycerin, an ethoxylated diethanolamine, a propoxylated diethanolamine, a butoxylated diethanolamine, an ethoxylated triethanolamine, a propoxylated triethanolamine, a butoxylated triethanolamine, an ethoxylated trimethylolpropane, a propoxylated trimethylolpropane, a butoxylated trimethylolpropane, an ethoxylated erythritol, a propoxylated erythritol, a butoxylated erythritol, an ethoxylated pentaerythritol, a propoxylated pentaerythritol, a butoxylated pentaerythritol, an ethoxylated ethylenediamine, a propoxylated ethylenediamine, a butoxylated ethylenediamine, an aliphatic polyester diol, an aromatic polyester polyol, or a combination thereof.

Embodiment 6

The polyurethane or polyisocyanurate foam of any of embodiments 1-4, wherein the polyol further comprises a propoxylated sucrose, a propoxylated glycerin, an aromatic polyester diol, or a combination thereof.

Embodiment 7

The polyurethane or polyisocyanurate foam of any of embodiments 1-6, wherein the aromatic isocyanate compound comprises 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexylmethane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha,alpha,alpha',alpha'-tetramethyl-1,3-xylylene diisocyanate, alpha,alpha,alpha',alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, an oligomeric diphenylmethane diisocyanate having an average of greater than 2 and less than or equal to 4 isocyanate groups per molecule, or a combination thereof.

Embodiment 8

The polyurethane or polyisocyanurate foam of any of embodiments 1-6, wherein the aromatic isocyanate compound comprises an oligomeric diphenylmethane diisocyanate having an average of greater than 2 and less than or equal to 4 isocyanate groups per molecule.

Embodiment 9

The polyurethane or polyisocyanurate foam of any of embodiments 1-8, having a core density of 0.03 to 0.06 grams/centimeter$^3$ determined at 23° C. using ASTM D 1622-03.

Embodiment 10

The polyurethane or polyisocyanurate foam of any of embodiments 1-9, wherein the polyurethane or polyisocyanurate foam is a polyurethane foam, and the isocyanate index is 105 to 125.

Embodiment 11

The polyurethane or polyisocyanurate foam of any of embodiments 1-9, wherein the polyurethane or polyisocyanurate foam is a polyisocyanurate foam, and the isocyanate index is 180 to 350.

Embodiment 12

The polyurethane or polyisocyanurate foam of embodiment 1, wherein the polyurethane or polyisocyanurate foam is a polyurethane foam, and the isocyanate index is 105 to 125; wherein the poly(phenylene ether) has a number average molecular weight of 1000 to 1500 atomic mass units and an average of 1.6 to 2.5 hydroxyl groups per molecule; wherein the poly(phenylene ether) is a copolymer of a monohydric phenol comprising 2,6-dimethylphenol and a dihydric phenol comprising 2,2-bis(3,5-dimethyl-4-hydroxyphenyl)propane; wherein the polyol comprises the poly(phenylene ether) in an amount of 5 to 50 weight percent, based on the weight of the polyol composition, and further comprises 50 to 95 weight percent of a propoxylated sucrose, a propoxylated glycerin, or a combination thereof; and wherein the aromatic isocyanate compound comprises an oligomeric diphenylmethane diisocyanate having an average of greater than 2 and less than or equal to 4 isocyanate groups per molecule.

Embodiment 13

The polyurethane or polyisocyanurate foam of embodiment 1, wherein the polyurethane or polyisocyanurate foam is a polyisocyanurate foam, and the isocyanate index is 180 to 350; wherein the poly(phenylene ether) has a number average molecular weight of 1000 to 1500 atomic mass units and an average of 1.6 to 2.5 hydroxyl groups per molecule; wherein the poly(phenylene ether) is a copolymer of a monohydric phenol comprising 2,6-dimethylphenol and a dihydric phenol comprising 2,2-bis(3,5-dimethyl-4-hydroxyphenyl)propane; wherein the polyol comprises the poly(phenylene ether) in an amount of 5 to 50 weight percent, based on the weight of the polyol composition, and further comprises 50 to 95 weight percent of a propoxylated sucrose, a propoxylated glycerin, an aromatic polyester diol, or a combination thereof; and wherein the aromatic isocyanate compound comprises an oligomeric diphenylmethane diisocyanate having an average of greater than 2 and less than or equal to 4 isocyanate groups per molecule.

Embodiment 14

An article comprising polyurethane or polyisocyanurate foam, the polyurethane or polyisocyanurate foam comprising the product of a reaction mixture comprising: a polyol comprising a poly(phenylene ether) having a number average molecular weight of 600 to 2000 atomic mass units and an average of 1.5 to 3 hydroxyl groups per molecule; an aromatic isocyanate compound having an average of at least 2 isocyanate groups per molecule, and a blowing agent; wherein the reaction mixture is characterized by an isocyanate index of 105 to 350; and wherein the polyurethane or polyisocyanurate foam has a core density of 0.03 to 0.7 gram/centimeter$^3$.

Embodiment 15

The article of embodiment 14, selected from the group consisting of refrigerators, freezers, water tanks, floor insulation panels, wall insulation panels, roof insulation panels, thermally insulated pipes, and thermally insulated containers.

Embodiment 16

The article of embodiment 14 or 15, wherein the polyurethane or polyisocyanurate foam is a polyurethane foam, and the isocyanate index is 105 to 125; wherein the poly(phenylene ether) has a number average molecular weight of 1000 to 1500 atomic mass units and an average of 1.6 to 2.5 hydroxyl groups per molecule; wherein the poly(phenylene ether) is a copolymer of a monohydric phenol comprising 2,6-dimethylphenol and a dihydric phenol comprising 2,2-bis (3,5-dimethyl-4-hydroxyphenyl)propane; wherein the polyol comprises the poly(phenylene ether) in an amount of 5 to 50 weight percent, based on the weight of the polyol composition, and further comprises 50 to 95 weight percent of a propoxylated sucrose, a propoxylated glycerin, or a combination thereof; and wherein the aromatic isocyanate compound comprises an oligomeric diphenylmethane diisocyanate having an average of greater than 2 and less than or equal to 4 isocyanate groups per molecule.

Embodiment 17

The article of embodiment 14 or 15, wherein the polyurethane or polyisocyanurate foam is a polyisocyanurate foam, and the isocyanate index is 180 to 350; wherein the poly (phenylene ether) has a number average molecular weight of 1000 to 1500 atomic mass units and an average of 1.6 to 2.5 hydroxyl groups per molecule; wherein the poly(phenylene ether) is a copolymer of a monohydric phenol comprising 2,6-dimethylphenol and a dihydric phenol comprising 2,2-bis (3,5-dimethyl-4-hydroxyphenyl)propane; wherein the polyol comprises the poly(phenylene ether) in an amount of 5 to 50 weight percent, based on the weight of the polyol composition, and further comprises 50 to 95 weight percent of a propoxylated sucrose, a propoxylated glycerin, an aromatic polyester diol, or a combination thereof; and wherein the aromatic isocyanate compound comprises an oligomeric diphenylmethane diisocyanate having an average of greater than 2 and less than or equal to 4 isocyanate groups per molecule.

The invention is further illustrated by the following non-limiting examples.

Examples 1-8

Comparative Example 1

These examples illustrate the effects of substituting poly (phenylene ether) for polyether polyol in a polyurethane formulation. Raw materials used in the working examples are summarized in Table 1.

TABLE 1

| Reagent | Description |
|---|---|
| POLY-G ™ 74-376 | A blend of propoxylated sucrose, CAS Reg. No. 9049-71-2 and propoxylated glycerin, CAS Reg. No. 25791-96-2, the blend having an OH number of 368 milligrams KOH/gram and a viscosity of 2700 centipoise at 25° C.; available as POLY-G ™ 74-376 from Arch Chemicals, Inc. |
| TERATE ™ 4026 | An aromatic polyester polyol having an OH number of 200 milligrams/gram, a viscosity of 2500 centipoise at 25° C., a number average molecular weight of about 560 grams/mole, and about 2 hydroxyl groups per molecule; available as TERATE ™ 4026 from Invista. |
| PPE | A copolymer of 2,6-dimethylphenol and 2,2-bis(3,5-dimethyl-4-hydroxyphenyl)propane, CAS Reg. No. 1012321-47-9, having a hydroxyl equivalent weight of 778 grams per equivalent, and an intrinsic viscosity of 0.090 deciliters per gram as measured at 25° C. in chloroform; available as NORYL ™ PPO ™ SA90 Resin from SABIC Innovative Plastics. |
| RUBINATE ™ M | A blend of diphenylmethane diisocyanate monomer, dimer, and trimer having about 31 weight percent isocyanate groups, an isocyanate equivalent weight of about 135 grams per equivalent, and an average functionality of 2.7 isocyanate groups per molecule; available as RUBINATE ™ M from Huntsman. |
| DABCO 33LV ™ | 33 weight percent triethylenediamine (a catalyst for urethane formation and blowing) in dipropylene glycol; available as DABCO 33LV ™ from Air Products. |
| NIAX ™ A-1 | 70 weight percent bis(dimethylaminoethyl)ether (a catalyst for blowing) in dipropylene glycol; available as NIAX ™ catalyst A-1 from Momentive. |
| DABCO ™ TMR-4 | An N-hydroxyalkyl quaternary ammonium carboxylate (a catalyst for isocyanurate formation) having an OH number of 687 milligrams OH/gram and a viscosity of 34 centipoise at 25° C.; available as DABCO ™ TMR-4 from Air Products. |
| POLYCAT ™ 8 | N,N-dimethylcyclohexylamine (a catalyst for urethane formation); available as POLYCAT ™ 8 from Air Products. |
| DABCO ™ DC193 | A polysiloxane surfactant; available as DABCO ™ DC193 from Air Products. |
| ENOVATE ™ 3000 | 1,1,1,3,3-pentafluropropane (HFC-245fa; a physical blowing agent); available as ENOVATE ™ 3000 from Honeywell. |
| Glycerin | Glycerin, CAS Reg. No. 8043-29-6. |

All rigid foams were prepared using a high-torque mixer (CRAFSTMAN 10-Inch Drill Press, Model No. 137.219000) at 3,100 rotations per minute (rpm) speed. Polyol components ("Polyol system" in Tables 3, 4, 6, 7, and 9) and isocyanate components ("Isocyanate system" in Tables 3, 4, 6, 7, and 9) of the foam systems were mixed for 7 seconds. Afterwards, the mixture was transferred into an open cake box before the cream time and allowed to free-rise. Foaming profile, including cream time, gel time, rise time, and tack-free time was measured on all foams.

The following stages are characteristic of the reaction and foaming process.

The mix time indicates the time needed for mixing the reactants.

The cream time is the time which elapses from the start of mixing of the reactants to the first definite appearance of foam expansion. In many cases this can be seen clearly by a color change as the reaction mixture begins to rise. With slow reacting mixtures this requires practiced observation.

The gel time is the interval of time between mixing the reactants and the formation of a non-flowing, semi-solid, jelly-like system. It is the time when the foam has developed enough gel strength to be dimensionally stable. After the gel time, the speed at which the foam rises slows down.

The rise time is the time from the start of mixing until the end of the optically perceptible rise. Hence it is the time until foam expansion ceases. The surface of the foam is still tacky when the rise process is complete.

The tack-free time is the time elapsing from the start of mixing to the moment when the foam surface has cured sufficiently that its surface is no longer tacky or sticky. The moment of freedom from tack can be determined by repeatedly testing the foam surface with a wooden rod.

Due to the low solubility of the poly(phenylene ether) resin in polyols used to make rigid foams, the poly(phenylene ether) resin was added to the isocyanate system of the foam components. The poly(phenylene ether) resin was agitated with the isocyanate for 40 minutes at 23° C. before reacting with the polyol component of the foam system.

All foams were cut and tested after aging at ambient conditions for one week. Table 2 summarizes the methods used for testing of rigid foams. The sample size of 2 inches×2 inches×2 inches is equivalent to 5.08 centimeters×5.08 centimeters×5.08 centimeters. The sample size of 6 inches×2 inches×½ inch is equivalent to 15.24 centimeters×5.08 centimeters×1.27 centimeters. The sample size of 1 inch×1 inch×1 inch is equivalent to 2.54 centimeters×2.54 centimeters×2.54 centimeters.

TABLE 2

| Test | Standard Procedure | Experimental Parameters |
| --- | --- | --- |
| Core Density, g/cc (grams per cubic centimeter) | ASTM D 1622-03 | Sample size: 2" × 2" × 1" |
| Compressive Strength, MPa and Compressive Strain at Yield, % | ASTM D 1621-00 | Sample size: 2" × 2" × 1" Head Speed: 2.5 mm/min Measured parallel to foam rise |
| Burn rate in a Horizontal Position, cm/minute | Method 1 ASTM D 635-03 | Sample size: 6" × 2" × ½" |
| | Method 2 ASTM D 4986-98 | Sample size: 6" × 2" × ½" |
| Aging Test at 70° C. and Ambient Humidity, Volume and mass change, % | ASTM D 2126-99 | Sample size: 2" × 2" × 1" |
| Aging Test at −30° C. and Ambient Humidity, Volume and mass change, % | ASTM D 2126-99 | Sample size: 2" × 2" × 1" |
| Water Absorption, mass and volume change, % | ASTM D 2842-01* | Sample size: 2" × 2" × 1" |
| Open (closed) cell content, % | ASTM D2856-94 | Sample size: 1" × 1" × 1" |
| Friability, mass loss | ASTM C 421-00 | Sample size: 1" × 1" × 1" (12 cubes in one run) |

*The foams were prepared in a free-rise mode by hand-mixing procedure. In order to have more representative samples, 2" × 2" × 1" samples were used in water absorption test instead of 6" × 6" × 3" samples.

The flammability was measured using two different methods: ASTM D 635-03 ("Method 1"; designed primarily for plastics) and ASTM D 4986-98 ("Method 2"; designed for cellular polymeric materials). In both cases, a specimen size specified for cellular materials was used. The major difference between the two test methods is possibility to weigh residual after burning test according to ASTM D 4986-98. This gives an indication of the amount of (desirable) char formation.

The open (closed) cell content was measured according to ASTM D 2856-94 method using a Beckman Air Compression Pycnometer, Model 930. The open (closed) cell content is reported as measured without correction for cells opened during preparation (cutting) of the test specimens with a band saw.

A model pour-in-place rigid PUR foam formulation with a combination of DABCO 33LV™ (performing as both "blowing" and "gelling" catalyst) and NIAX™ A-1 (very efficient "blowing" catalyst) was used to evaluate the effect of the poly(phenylene ether) on rigid foam properties. Due to the poor solubility of the poly(phenylene ether) in polyols used to make rigid foams, the poly(phenylene ether) was added via the isocyanate component.

Table 3 shows the evaluation of the poly(phenylene ether) as a weight-for-weight drop-in replacement of POLY-G™ 74-376 without any adjustment for the higher equivalent weight of the poly(phenylene ether). The isocyanate Index was held constant at 110 for all examples. The reactivity of the foaming systems increased by introduction of the poly(phenylene ether) as indicated by decreases in Gel times, Rise times, and Tack-free times. Comparison of Comparative Example 1 and Example 1 shows increased compression strength and decreased burn rate associated with the substitution of 3.64% poly(phenylene ether) in the formulation. Examples 3 and 4 exhibited slight deformation after 30 minutes at 120° C. The higher equivalent weight of the poly (phenylene ether) relative to POLY-G™ 74-376 results in a decrease in the overall isocyanate content in the formulation at the same Isocyanate Index.

TABLE 3

|  | Eq. Wt. | C. Ex. 1 | Ex. 1 | Ex. 2 | Ex. 3 |
|---|---|---|---|---|---|
| % PPE based on total polyols |  | 0 | 10 | 20 | 30 |
| % PPE based on total weight |  | 0 | 3.64 | 7.5 | 11.6 |
| Polyol system (parts by weight) |  |  |  |  |  |
| POLY-G ™ 74-376 | 152.45 | 100 | 90 | 80 | 70 |
| PPE | 924 | 0 | 10 | 20 | 30 |
| Water | 9 | 4.5 | 4.5 | 4.5 | 4.5 |
| DABCO ™ DC193 | 748 | 2 | 2 | 2 | 2 |
| DABCO 33LV ™ | 105 | 1.8 | 1.8 | 1.8 | 1.8 |
| NIAX ™ A-1 | 233.7 | 0.1 | 0.1 | 0.1 | 0.1 |
| Isocyanate System (parts by weight) |  |  |  |  |  |
| RUBINATE ™ M | 134.6 | 175.49 | 166.06 | 157.95 | 149.84 |
| Isocyanate Index |  | 110 | 110 | 110 | 110 |
| Reaction Profile of Free-rise |  |  |  |  |  |
| Mix time (sec) |  | 7 | 7 | 7 | 7 |
| Cream time (sec) |  | 13 | 21 | 18 | 16 |
| Gel time (sec) |  | 60 | 58 | 49 | 39 |
| Rise time (sec) |  | 103 | 109 | 96 | 90 |
| Tack-free time (sec) |  | 150 | 133 | 116 | 121 |
| Foam Properties |  |  |  |  |  |
| Free-rise density (g/cc) |  | 0.00336 | 0.00365 | 0.00309 | 0.00320 |
| Compressive Strength (MPa) |  | 0.228 | 0.262 | — | — |
| Compressive Strain at Yield (%) |  | 9.9 | 10 | — | — |
| Dimensional Stability at 120° C. after 30 min. |  | Hard, no deformations |  | Slight deformations |  |
| Flammability |  |  |  |  |  |
| Method 1 - Burn Rate, cm/min |  | 20 | 17 | — | — |

In order to increase the overall concentration of isocyanate in the formulations while maintaining the Isocyanate Index of 110, glycerin was introduced into Examples 4, 5, 6, 7, and 8. They are compared with Comparative Example 1 in Table 4.

TABLE 4

|  | Eq. Wt. | C. Ex. 1 | Ex. 4 | Ex. 5 | Ex. 6 |
|---|---|---|---|---|---|
| % PPE based on total polyols |  | 0 | 10 | 20 | 30 |
| % PPE based on total weight |  | 0 | 3.57 | 7.2 | 10.89 |
| Polyol system (parts by weight) |  |  |  |  |  |
| POLY-G ™ 74-376 | 152.45 | 100 | 88 | 76 | 64 |
| PPE | 924 | — | 10 | 20 | 30 |
| Glycerin | 30.7 | 0 | 2 | 4 | 6 |
| Water | 9 | 4.5 | 4.5 | 4.5 | 4.5 |
| DABCO ™ DC193 | 748 | 2 | 2 | 2 | 2 |
| DABCO 33LV ™ | 105 | 1.8 | 1.8 | 1.8 | 1.8 |
| NIAX ™ A-1 | 233.7 | 0.1 | 0.1 | 0.1 | 0.1 |
| Isocyanate System (parts by weight) |  |  |  |  |  |
| RUBINATE ™ M | 134.6 | 175.49 | 173.76 | 173.35 | 172.95 |
| Isocyanate Index |  | 110 | 110 | 110 | 110 |
| Reaction Profile of Free-rise |  |  |  |  |  |
| Mix time (sec) |  | 7 | 7 | 7 | 7 |
| Cream time (sec) |  | 13 | 14 | 12 | 12 |
| Gel time (sec) |  | 60 | 40 | 37 | 36 |
| Rise time (sec) |  | 103 | 100 | 85 | 111 |
| Tack-free time (sec) |  | 150 | 118 | 100 | 122 |
| Properties |  |  |  |  |  |
| Free-rise density (g/cc) |  | 0.00336 | 0.00323 | 0.00299 | 0.00334 |
| Compressive Strength (MPa) |  | 0.228 | 0.194 | 0.180 | 0.221 |
| Compressive Strain at Yield (%) |  | 9.9 | 10.0 | 9.8 | 10.0 |
| Friability, mass loss (%) |  | 5.8 | 8.9 | 8.3 | 10.6 |
| Dimensional Stability at 120° C. after 30 min. |  | Hard, No deformations |  |  |  |

TABLE 4-continued

| Flammability | | | | |
|---|---|---|---|---|
| Method 1 - Burn Rate, cm/min | 20 | 20 | 19 | 18 |
| Method 2 - Burn Rate, cm/min | 23 | 23 | 27 | 25 |
| Method 2 - Wt. Retention (%) | 31 | 31 | 33 | 39 |

| | Eq. Wt. | Ex. 7 | Ex. 8 |
|---|---|---|---|
| % PPE based on total polyols | | 35 | 40 |
| % PPE based on total weight | | 12.9 | 14.97 |
| Polyol system (parts by weight) | | | |
| POLY-G ™ 74-376 | 152.45 | 59 | 54 |
| PPE | 924 | 35 | 40 |
| Glycerin | 30.7 | 6 | 6 |
| Water | 9 | 4.5 | 4.5 |
| DABCO ™ DC193 | 748 | 2 | 2 |
| DABCO 33LV ™ | 105 | 1.8 | 1.8 |
| NIAX ™ A-1 | 233.7 | 0.1 | 0.1 |
| Isocyanate System (parts by weight) | | | |
| RUBINATE ™ M | 134.6 | 168.89 | 164.84 |
| Isocyanate Index | | 110 | 110 |
| Reaction Profile of Free-rise | | | |
| Mix time (sec) | | 7 | 7 |
| Cream time (sec) | | 11 | 10 |
| Gel time (sec) | | 40 | 33 |
| Rise time (sec) | | 110 | 109 |
| Tack-free time (sec) | | 124 | 126 |
| Properties | | | |
| Free-rise density (g/cc) | | 0.00338 | 0.00315 |
| Compressive Strength (MPa) | | — | — |
| Compressive Strain at Yield (%) | | — | — |
| Friability, mass loss (%) | | — | — |
| Dimensional Stability at 120° C. after 30 min. | | Hard, No deformations | |
| Flammability | | | |
| Method 1 - Burn Rate (cm/min) | | — | — |
| Method 2 - Burn Rate (cm/min) | | 21 | 21 |
| Method 2 - Wt. Retention (%) | | 40 | 41 |

Examples 4, 5, 6, 7, and 8 exhibited reduced tack-free times relative to Comparative Example 1. They also exhibited good dimensional stability after heating for 30 minutes at 120° C. The density and compressive strength of the foam was not significantly affected by introduction up to 10.89% (of total weight) of poly(phenylene ether). The friability slightly increased by introduction of poly(phenylene ether), but still it is relatively low for the rigid polyurethane foams. There was a slight decrease in burn rate (Method 1) for Examples 5 and 6, and an increase in weight retention (char) after burning (Method 2) for Examples 5-8.

The dimensional stability Examples 4, 5, and 6 at 70° C. and −30° C. was similar to those measured for Comparative Example 1, as shown in Table 5.

TABLE 5

| | C. Ex. 1 | Ex. 4 | Ex. 5 | Ex. 6 |
|---|---|---|---|---|
| % PPE based on total polyols | 0 | 10 | 20 | 30 |
| % PPE based on total weight | 0 | 3.57 | 7.20 | 10.89 |

TABLE 5-continued

| | Mass and Volume Change with Aging | | | | | | | |
|---|---|---|---|---|---|---|---|---|
| | Δ Mass (%) | Δ Vol., (%) | Δ Mass (%) | Δ Vol., (%) | Δ Mass (%) | Δ Vol., (%) | Δ Mass (%) | Δ Vol., (%) |
| Aging Test at −30° C. | | | | | | | | |
| after 1 week (168 h) | 0.78 | 0.3 | 1.41 | −0.12 | 0.63 | −1.54 | 1.54 | 1.27 |
| after 2 weeks (336 h) | 0.59 | −1.08 | 1.13 | 0.38 | 0.53 | −1.34 | 0.44 | 1.41 |
| Aging Test at 70° C. | | | | | | | | |
| after 1 week (168 h) | −1.21 | 2.41 | 1.54 | 1.71 | 1.01 | 0.59 | 0.35 | 1.71 |
| after 2 weeks (336 h) | −1.09 | 0.96 | 0.03 | 1.22 | −0.07 | −0.6 | −0.96 | 1.3 |

Examples 9-12

Comparative Example 2

Free-rise polyisocyanurate foams were prepared based on a combination of water and HFC-245fa (ENOVATE™ 3000)

as a blowing system and a 1:1 combination of POLY-G™ 74-376 and TERATE™ 4026 polyols at an isocyanate index of 250. Due to the poor solubility of poly(phenylene ether) in polyols used to make rigid foams, poly(phenylene ether) was added via the isocyanate component. The poly(phenylene ether) was introduced as a drop-in replacement for POLY-G™ 74-376 and TERATE™ 4026 polyols. In order to adjust amount of the isocyanate component in the PIR foam formulations, some glycerin was added along with poly(phenylene ether). All foams were prepared using a standard laboratory hand-mixing procedure targeting density of 0.0032 to 0.0048 grams/centimeter$^3$. Formulations, reaction profiles, and properties are summarized in Table 6.

TABLE 6

|  | Eq. Wt. | C. Ex. 2 | Ex. 9 | Ex. 10 | Ex. 11 |
|---|---|---|---|---|---|
| % PPE based on total polyols |  | 0 | 10 | 20 | 30 |
| % PPE based on total weight |  | 0 | 2.82 | 5.63 | 8.44 |
| Polyol system (parts by weight) |  |  |  |  |  |
| POLY-G ™ 74-376 | 152.45 | 50 | 44 | 38 | 32.5 |
| TERATE ™ 4026 | 280.5 | 50 | 44 | 38.5 | 32.5 |
| PPE | 924 | 0 | 10 | 20 | 30 |
| Glycerin | 30.7 | 0 | 2 | 3.5 | 5 |
| Water | 9 | 1 | 1 | 1 | 1 |
| DABCO ™ DC193 | 748 | 1.6 | 1.6 | 1.6 | 1.6 |
| POLYCAT ™ 8 |  | 0.45 | 0.45 | 0.45 | 0.45 |
| DABCO ™ TMR-4 | 81.66 | 2.35 | 2.35 | 2.35 | 2.35 |
| ENOVATE ™ 3000 |  | 25 | 25 | 25 | 25 |
| Isocyanate System (parts by weight) |  |  |  |  |  |
| RUBINATE ™ M | 134.6 | 219.67 | 224.61 | 224.67 | 225.25 |
| Isocyanate Index |  | 250 | 250 | 250 | 250 |
| Reaction Profile of Free-rise |  |  |  |  |  |
| Mix time (sec) |  | 7 | 7 | 7 | 7 |
| Cream time (sec) |  | 12 | 14 | 17 | 20 |
| Gel time (sec) |  | 56 | 35 | 53 | 54 |
| Rise time (sec) |  | 178 | 164 | 170 | 200 |
| Tack-free time (sec) |  | 370 | 344 | 342 | 435 |
| Properties |  |  |  |  |  |
| Free-rise density (g/cc) |  | 0.00341 | 0.00362 | 0.00373 | 0.00426 |
| Compressive Strength (MPa) |  | 0.176 | 0.192 | 0.165 | 0.172 |
| Compressive Strain at Yield (%) |  | 6.6 | 6.6 | 8.0 | 6.4 |
| Friability, mass loss (%) |  | 13 | 24 | 32 | 57 |
| Open cell content (%)* |  | 23.3 | 23.0 | 21.0 | 22.6 |
| Closed cell content (%)* |  | 76.7 | 77 | 79 | 77.4 |
| Dimensional Stability at 120° C. after 30 min. |  | Hard, No deformations visible |  |  |  |
| Flammability |  |  |  |  |  |
| Method 1 - Burn Rate (cm/min) |  | 17 | 16 | 11 | Self-extinguished |
| Method 2 - Burn Rate (cm/min) |  | 16 | 12 | 10 | 9 |
| Method 2 - Wt. Retention (%) |  | 50 | 61 | 62 | 64 |

|  | Eq. Wt. | Ex. 12 |
|---|---|---|
| % PPE based on total polyols |  | 40 |
| % PPE based on total weight |  | 11.23 |
| Polyol system (parts by weight) |  |  |
| POLY-G ™ 74-376 | 152.45 | 27 |
| TERATE ™ 4026 | 280.5 | 26.5 |
| PPE | 924 | 40 |
| Glycerin | 30.7 | 6.5 |
| Water | 9 | 1 |
| DABCO ™ DC193 | 748 | 1.6 |
| POLYCAT ™ 8 |  | 0.45 |
| DABCO ™ TMR-4 | 81.66 | 2.35 |
| ENOVATE ™ 3000 |  | 25 |
| Isocyanate System (parts by weight) |  |  |
| RUBINATE ™ M | 134.6 | 225.83 |
| Isocyanate Index |  | 250 |
| Reaction Profile of Free-rise |  |  |
| Mix time (sec) |  | 7 |
| Cream time (sec) |  | 22 |
| Gel time (sec) |  | 58 |
| Rise time (sec) |  | 220 |
| Tack-free time (sec) |  | 620 |

TABLE 6-continued

| Properties | |
|---|---|
| Free-rise density (g/cc) | 0.00429 |
| Compressive Strength (MPa) | 0.124 |
| Compressive Strain at Yield (%) | 6.9 |
| Friability, mass loss (%) | — |
| Open cell content (%) | — |
| Closed cell content (%) | — |
| Dimensional Stability at 120° C. after 30 min. | Some deformation |
| Flammability | |
| Method 1 - Burn Rate (cm/min) | Self-extinguished |
| Method 2 - Burn Rate (cm/min) | Self-extinguished |
| Method 2 - Wt. Retention (%) | 88 |

Both burn rate test Method 1 and Method 2 indicated that the burn rate was significantly decreased with introduction of poly(phenylene ether). Examples 11 and 12 exhibited self-extinguishing characteristics with significantly higher residue in comparison to Comparative Example 2. The system reactivity, as well as foam density and compressive strength properties were slightly affected by introduction of poly(phenylene ether).

Data from water uptake and dimensional stability after aging at 70° and −30° C. are summarized in Table 7. There was no significant change between Comparative Example 2 and Examples 9, 10, and 11.

TABLE 7

| | C. Ex. 2 | Ex. 9 | Ex. 10 | Ex. 11 |
|---|---|---|---|---|
| % PPE based on total polyols. | 0 | 10 | 20 | 30 |
| % PPE based on total formulation wt. | 0 | 2.82 | 5.63 | 8.44 |

| | Mass and Volume Change with Aging and Water Immersion Tests | | | | | | | |
|---|---|---|---|---|---|---|---|---|
| | Δ Mass (%) | Δ Vol., (%) | Δ Mass (%) | Δ Vol., (%) | Δ Mass (%) | Δ Vol., (%) | Δ Mass (%) | Δ Vol., (%) |
| Aging Test at −30° C. | | | | | | | | |
| after 1 week (168 h) | −0.18 | −0.67 | −0.17 | −0.21 | −0.14 | 0.27 | −0.52 | −0.08 |
| after 2 weeks (336 h) | −1.48 | −0.05 | −0.68 | −0.06 | −0.09 | 0.24 | −0.63 | −0.37 |
| Aging Test at 70° C. | | | | | | | | |
| after 1 week (168 h) | −2.08 | 0.7 | −1.27 | −0.25 | −2.01 | 0.34 | −2.28 | 0.7 |
| after 2 weeks (336 h) | −2.94 | −0.31 | −1.9 | 0.67 | −2.23 | −0.18 | −2.5 | 0.21 |
| Water Absorption at 25° C. | | | | | | | | |
| after 4 days (96 h) | 160 | 0.49 | 127 | 0.88 | 133 | 1.64 | 150 | 1.08 |
| after 1 week (168 h) | 199 | 0.84 | 167 | 1.15 | 129 | 1.27 | 140 | 0.88 |

Examples 13-15

Comparative Example 3

Polyisocyanurate foams with an Isocyanate Index of 220 were prepared. Formulations, reaction profiles, and properties are summarized in Table 8. The system reactivity, as well as foam density and compressive strength properties were slightly affected by introduction of poly(phenylene ether). Burn rates (Method 2) were significantly decreased with the introduction of poly(phenylene ether).

TABLE 8

| | Eq. Wt. | C. Ex. 3 | Ex. 13 | Ex. 14 | Ex. 15 |
|---|---|---|---|---|---|
| % PPE based on total polyols | | 0 | 10 | 20 | 30 |
| % PPE based on total weight | | 0 | 3.04 | 6.08 | 9.11 |

TABLE 8-continued

|  | Eq. Wt. | C. Ex. 3 | Ex. 13 | Ex. 14 | Ex. 15 |
|---|---|---|---|---|---|
| Polyol system (parts by weight) | | | | | |
| POLY-G ™ 74-376 | 150.4 | 50 | 44 | 38 | 32.5 |
| TERATE ™ 4026 | 280.5 | 50 | 44 | 38.5 | 32.5 |
| PPE | 924 | 0 | 10 | 20 | 30 |
| Glycerin | 30.7 | 0 | 2 | 3.5 | 5 |
| Water | 9 | 1 | 1 | 1 | 1 |
| DABCO ™ DC193 | 748 | 1.6 | 1.6 | 1.6 | 1.6 |
| POLYCAT ™ 8 | | 0.45 | 0.45 | 0.45 | 0.45 |
| DABCO ™ TMR-4 | 81.66 | 2.35 | 2.35 | 2.35 | 2.35 |
| ENOVATE ™ 3000 | | 25 | 25 | 25 | 25 |
| Isocyanate System (parts by weight) | | | | | |
| RUBINATE ™ M | 135.05 | 193.93 | 198.29 | 198.35 | 198.86 |
| Isocyanate Index | | 220 | 220 | 220 | 220 |
| Reaction Profile of Free-rise | | | | | |
| Mix time (sec) | | 7 | 7 | 7 | 7 |
| Cream time (sec) | | 12 | 12 | 15 | 30 |
| Gel time (sec) | | 35 | 25 | 29 | 41 |
| Rise time (sec) | | 170 | 167 | 192 | 241 |
| Tack-free time (sec) | | 274 | 292 | 358 | 415 |
| Properties | | | | | |
| Free-rise density (g/cc) | | 0.00378 | 0.00357 | 0.003587 | 0.00376 |
| Compressive Strength (MPa) | | 0.192 | 0.199 | 0.173 | 0.166 |
| Compressive Strain at Yield (%) | | 8.08 | 7.84 | 6.91 | 6.98 |
| Friability, mass loss (%) | | 9.4 | 15.8 | 33.4 | 42.6 |
| Dimensional Stability at 120° C. after 30 min. | | | Dimensionally Stable, no visible deformations | | |
| Flammability | | | | | |
| Method 2 - Burn Rate (cm/min) | | 20 | 18 | 15 | 13 |
| Method 2 - Wt. Retention (%) | | 40 | 37 | 43 | 39 |

Data from water uptake and dimensional stability after aging at 70° and −30° C. are summarized in Table 9. There was no significant change between Comparative Example 3 and Examples 15 and 16.

TABLE 9

| | C. Ex. 3 | | Ex. 14 | | Ex. 15 | |
|---|---|---|---|---|---|---|
| | Mass and Volume Change with Aging and Water Immersion Tests | | | | | |
| | Δ Mass (%) | Δ Vol., (%) | Δ Mass (%) | Δ Vol., (%) | Δ Mass (%) | Δ Vol., (%) |
| Aging Test at −30° C. | | | | | | |
| After 1 week (168 h) | 0.46 | −0.69 | 0.11 | 0.16 | −0.09 | −1.24 |
| After 2 weeks (336 h) | 0.22 | −1.54 | −0.06 | −0.41 | −0.19 | −1.24 |
| Aging Test at 70° C. | | | | | | |
| After 1 week (168 h) | −2.01 | 1.12 | −1.66 | 0.18 | −2.55 | 0.54 |
| After 2 weeks (336 h) | −1.96 | 0.27 | −1.72 | −0.19 | −2.67 | −0.19 |
| Water Absorption at 25° C. | | | | | | |
| After 4 days (96 h) | 122 | 3.65 | 116 | 4.88 | 177 | 1.1 |
| After 1 week (168 h) | 128 | — | 122 | — | 166 | 0.68 |

The invention claimed is:

1. A polyurethane or polyisocyanurate foam comprising the product of a reaction mixture comprising:
 a polyol comprising a poly(phenylene ether) having a number average molecular weight of 600 to 2000 atomic mass units and an average of 1.5 to 3 hydroxyl groups per molecule;
 an aromatic isocyanate compound having an average of at least 2 isocyanate groups per molecule; and
 a blowing agent;
 wherein the reaction mixture is characterized by an isocyanate index of 105 to 350; and
 wherein the polyurethane or polyisocyanurate foam has a core density of 0.03 to 0.7 gram/centimeter$^3$.

2. The polyurethane or polyisocyanurate foam of claim 1, wherein the poly(phenylene ether) is a copolymer of monomers comprising a monohydric phenol and a dihydric phenol.

3. The polyurethane or polyisocyanurate foam of claim 2, wherein the monohydric phenol comprises 2,6-dimethylphenol and the dihydric phenol comprises 2,2-bis(3,5-dimethyl-4-hydroxyphenyl)propane.

4. The polyurethane or polyisocyanurate foam of claim 1, wherein the polyol comprises the poly(phenylene ether) in an amount of 5 to 50 weight percent, based on the weight of the polyol.

5. The polyurethane or polyisocyanurate foam of claim 1, wherein the polyol further comprises an ethoxylated saccharide, a propoxylated saccharide, a butoxylated saccharide, an ethoxylated glycerin, a propoxylated glycerin, a butoxylated glycerin, an ethoxylated diethanolamine, a propoxylated diethanolamine, a butoxylated diethanolamine, an ethoxylated triethanolamine, a propoxylated triethanolamine, a butoxylated triethanolamine, an ethoxylated trimethylolpropane, a propoxylated trimethylolpropane, a butoxylated trimethylolpropane, an ethoxylated erythritol, a propoxylated erythritol, a butoxylated erythritol, an ethoxylated pentaerythritol, a propoxylated pentaerythritol, a butoxylated pentaerythritol, an ethoxylated ethylenediamine, a propoxylated ethylenediamine, a butoxylated ethylenediamine, an aliphatic polyester diol, an aromatic polyester polyol, or a combination thereof.

6. The polyurethane or polyisocyanurate foam of claim 1, wherein the polyol further comprises a propoxylated sucrose, a propoxylated glycerin, an aromatic polyester diol, or a combination thereof.

7. The polyurethane or polyisocyanurate foam of claim 1, wherein the aromatic isocyanate compound comprises 1,4-tetramethylene diisocyanate, 1,6-hexamethylene diisocyanate, 2,2,4-trimethyl-1,6-hexamethylene diisocyanate, 1,12-dodecamethylene diisocyanate, cyclohexane-1,3-diisocyanate, cyclohexane-1,4-diisocyanate, 1-isocyanato-2-isocyanatomethyl cyclopentane, 1-isocyanato-3-isocyanatomethyl-3,5,5-trimethyl-cyclohexane, bis(4-isocyanatocyclohexyl)methane, 2,4'-dicyclohexyl-methane diisocyanate, 1,3-bis(isocyanatomethyl)-cyclohexane, 1,4-bis-(isocyanatomethyl)-cyclohexane, bis(4-isocyanato-3-methyl-cyclohexyl)methane, alpha, alpha, alpha',alpha'-tetramethyl-1,3-xylylene diisocyanate, alpha, alpha, alpha', alpha'-tetramethyl-1,4-xylylene diisocyanate, 1-isocyanato-1-methyl-4(3)-isocyanatomethyl cyclohexane, 2,4-hexahydrotoluene diisocyanate, 2,6-hexahydrotoluene diisocyanate, 1,3-phenylene diisocyanate, 1,4-phenylene diisocyanate, 2,4-toluene diisocyanate, 2,6-toluene diisocyanate, 2,4-diphenylmethane diisocyanate, 4,4'-diphenylmethane diisocyanate, 1,5-diisocyanato naphthalene, an oligomeric diphenylmethane diisocyanate having an average of greater than 2 and less than or equal to 4 isocyanate groups per molecule, or a combination thereof.

8. The polyurethane or polyisocyanurate foam of claim 1, wherein the aromatic isocyanate compound comprises an oligomeric diphenylmethane diisocyanate having an average of greater than 2 and less than or equal to 4 isocyanate groups per molecule.

9. The polyurethane or polyisocyanurate foam of claim 1, having a core density of 0.03 to 0.06 grams/centimeter$^3$ determined at 23° C. using ASTM D 1622-03.

10. The polyurethane or polyisocyanurate foam of claim 1, wherein the polyurethane or polyisocyanurate foam is a polyurethane foam, and the isocyanate index is 105 to 125.

11. The polyurethane or polyisocyanurate foam of claim 1, wherein the polyurethane or polyisocyanurate foam is a polyisocyanurate foam, and the isocyanate index is 180 to 350.

12. The polyurethane or polyisocyanurate foam of claim 1,
wherein the polyurethane or polyisocyanurate foam is a polyurethane foam, and the isocyanate index is 105 to 125;
wherein the poly(phenylene ether) has a number average molecular weight of 1000 to 1500 atomic mass units and an average of 1.6 to 2.5 hydroxyl groups per molecule;
wherein the poly(phenylene ether) is a copolymer of a monohydric phenol comprising 2,6-dimethylphenol and a dihydric phenol comprising 2,2-bis(3,5-dimethyl-4-hydroxyphenyl)propane;
wherein the polyol comprises the poly(phenylene ether) in an amount of 5 to 50 weight percent, based on the weight of the polyol composition, and further comprises 50 to 95 weight percent of a propoxylated sucrose, a propoxylated glycerin, or a combination thereof; and
wherein the aromatic isocyanate compound comprises an oligomeric diphenylmethane diisocyanate having an average of greater than 2 and less than or equal to 4 isocyanate groups per molecule.

13. The polyurethane or polyisocyanurate foam of claim 1,
wherein the polyurethane or polyisocyanurate foam is a polyisocyanurate foam, and the isocyanate index is 180 to 350;
wherein the poly(phenylene ether) has a number average molecular weight of 1000 to 1500 atomic mass units and an average of 1.6 to 2.5 hydroxyl groups per molecule;
wherein the poly(phenylene ether) is a copolymer of a monohydric phenol comprising 2,6-dimethylphenol and a dihydric phenol comprising 2,2-bis(3,5-dimethyl-4-hydroxyphenyl)propane;
wherein the polyol comprises the poly(phenylene ether) in an amount of 5 to 50 weight percent, based on the weight of the polyol composition, and further comprises 50 to 95 weight percent of a propoxylated sucrose, a propoxylated glycerin, an aromatic polyester diol, or a combination thereof; and
wherein the aromatic isocyanate compound comprises an oligomeric diphenylmethane diisocyanate having an average of greater than 2 and less than or equal to 4 isocyanate groups per molecule.

14. An article comprising polyurethane or polyisocyanurate foam, the polyurethane or polyisocyanurate foam comprising the product of a reaction mixture comprising:
a polyol comprising a poly(phenylene ether) having a number average molecular weight of 600 to 2000 atomic mass units and an average of 1.5 to 3 hydroxyl groups per molecule;
an aromatic isocyanate compound having an average of at least 2 isocyanate groups per molecule, and
a blowing agent;
wherein the reaction mixture is characterized by an isocyanate index of 105 to 350; and
wherein the polyurethane or polyisocyanurate foam has a core density of 0.03 to 0.7 gram/centimeter$^3$.

15. The article of claim 14, selected from the group consisting of refrigerators, freezers, water tanks, floor insulation panels, wall insulation panels, roof insulation panels, thermally insulated pipes, and thermally insulated containers.

16. The article of claim 14,
wherein the polyurethane or polyisocyanurate foam is a polyurethane foam, and the isocyanate index is 105 to 125;
wherein the poly(phenylene ether) has a number average molecular weight of 1000 to 1500 atomic mass units and an average of 1.6 to 2.5 hydroxyl groups per molecule;
wherein the poly(phenylene ether) is a copolymer of a monohydric phenol comprising 2,6-dimethylphenol and a dihydric phenol comprising 2,2-bis(3,5-dimethyl-4-hydroxyphenyl)propane;
wherein the polyol comprises the poly(phenylene ether) in an amount of 5 to 50 weight percent, based on the weight of the polyol composition, and further comprises 50 to 95 weight percent of a propoxylated sucrose, a propoxylated glycerin, or a combination thereof; and
wherein the aromatic isocyanate compound comprises an oligomeric diphenylmethane diisocyanate having an average of greater than 2 and less than or equal to 4 isocyanate groups per molecule.

17. The article of claim 14,
wherein the polyurethane or polyisocyanurate foam is a polyisocyanurate foam, and the isocyanate index is 180 to 350;
wherein the poly(phenylene ether) has a number average molecular weight of 1000 to 1500 atomic mass units and an average of 1.6 to 2.5 hydroxyl groups per molecule;

wherein the poly(phenylene ether) is a copolymer of a monohydric phenol comprising 2,6-dimethylphenol and a dihydric phenol comprising 2,2-bis(3,5-dimethyl-4-hydroxyphenyl)propane;

wherein the polyol comprises the poly(phenylene ether) in an amount of 5 to 50 weight percent, based on the weight of the polyol composition, and further comprises 50 to 95 weight percent of a propoxylated sucrose, a propoxylated glycerin, an aromatic polyester diol, or a combination thereof; and wherein the aromatic isocyanate compound comprises an oligomeric diphenylmethane diisocyanate having an average of greater than 2 and less than or equal to 4 isocyanate groups per molecule.

* * * * *